United States Patent
Lowe

(10) Patent No.: US 9,721,076 B2
(45) Date of Patent: *Aug. 1, 2017

(54) SYSTEM AND METHOD FOR REMOTELY ASSIGNING AND REVOKING ACCESS CREDENTIALS USING A NEAR FIELD COMMUNICATION EQUIPPED MOBILE PHONE

(71) Applicant: Assa Abloy AB, Stockholm (SE)

(72) Inventor: Peter R. Lowe, Peyton, CO (US)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/674,175

(22) Filed: Mar. 31, 2015

(65) Prior Publication Data

US 2015/0222613 A1  Aug. 6, 2015

Related U.S. Application Data

(63) Continuation of application No. 13/404,915, filed on Feb. 24, 2012, which is a continuation of application
(Continued)

(51) Int. Cl.
*G06F 7/04* (2006.01)
*G06F 17/30* (2006.01)
(Continued)

(52) U.S. Cl.
CPC .............. *G06F 21/31* (2013.01); *G06F 21/45* (2013.01); *H04L 63/0492* (2013.01); *H04L 63/062* (2013.01); *H04L 63/068* (2013.01); *H04L 63/08* (2013.01); *H04L 63/0853* (2013.01); *H04L 63/10* (2013.01); *H04W 4/008* (2013.01); *H04W 4/023* (2013.01); *H04W 12/04* (2013.01);
(Continued)

(58) Field of Classification Search
CPC .......................... G06Q 20/3278; H04W 36/32
USPC ........ 455/554.2, 41.2, 411, 558, 403, 412.2; 370/352, 328; 705/39, 37; 709/204, 223; 726/26, 5, 19, 6, 2; 340/5.61, 4.32, 5.65
See application file for complete search history.

(56) References Cited

U.S. PATENT DOCUMENTS 4,727,368 A  2/1988 Larson et al.
5,204,663 A  4/1993 Lee
(Continued)

FOREIGN PATENT DOCUMENTS

EP  0829828  3/1998
EP  1103922  5/2001
(Continued)

OTHER PUBLICATIONS

Petition for Ineter Partes Review of U.S. Pat. No. 7,706,778, filed Jun. 18, 2015 64 pages.
(Continued)

*Primary Examiner* — Kiet Doan
(74) *Attorney, Agent, or Firm* — Fish & Richardson P.C.

(57) ABSTRACT

The present invention is generally directed toward a mobile device that can be used in a secure access system. More specifically, the mobile device can have credential data loaded thereon remotely updated, enabled, disabled, revoked, or otherwise altered with a message sent from, for example, a control panel and/or controller in the system.

31 Claims, 5 Drawing Sheets

Related U.S. Application Data

No. 12/628,574, filed on Dec. 1, 2009, now Pat. No. 8,150,374, which is a continuation of application No. 11/397,542, filed on Apr. 3, 2006, now Pat. No. 7,706,778.

(60) Provisional application No. 60/668,828, filed on Apr. 5, 2005.

(51) Int. Cl.

| | | |
|---|---|---|
| G06F 21/31 | (2013.01) | |
| H04L 29/06 | (2006.01) | |
| H04W 12/04 | (2009.01) | |
| H04W 88/02 | (2009.01) | |
| G06F 21/45 | (2013.01) | |
| H04W 12/06 | (2009.01) | |
| H04W 12/08 | (2009.01) | |
| H04W 4/00 | (2009.01) | |
| H04W 4/02 | (2009.01) | |
| H04W 48/04 | (2009.01) | |
| G07C 9/00 | (2006.01) | |

(52) U.S. Cl.
CPC ........... *H04W 12/06* (2013.01); *H04W 12/08* (2013.01); *H04W 48/04* (2013.01); *H04W 88/02* (2013.01); *G07C 9/00007* (2013.01)

(56) References Cited

U.S. PATENT DOCUMENTS

| | | | |
|---|---|---|---|
| 5,678,200 A | 10/1997 | Levi | |
| 5,903,845 A | 5/1999 | Buhrmann et al. | |
| 6,095,416 A | 8/2000 | Grant et al. | |
| 6,216,227 B1 | 4/2001 | Goldstein | |
| 6,257,486 B1 | 7/2001 | Teicher et al. | |
| 6,374,356 B1 | 4/2002 | Daigneault et al. | |
| 6,577,299 B1 | 6/2003 | Schiller et al. | |
| 6,624,739 B1 | 9/2003 | Stobbe | |
| 6,668,322 B1 | 12/2003 | Wood et al. | |
| 6,719,200 B1 | 4/2004 | Wiebe | |
| 6,766,450 B2 | 7/2004 | Micali | |
| 6,859,650 B1 | 2/2005 | Ritter | |
| 6,895,234 B1 | 5/2005 | Laursen et al. | |
| 7,012,503 B2 | 3/2006 | Nielsen | |
| 7,114,179 B1 | 9/2006 | Ritter et al. | |
| 7,190,948 B2 | 3/2007 | Donley et al. | |
| 7,197,767 B2 | 3/2007 | Kusakabe et al. | |
| 7,205,882 B2 | 4/2007 | Libin | |
| 7,308,254 B1 | 12/2007 | Rissanen | |
| 7,322,043 B2 | 1/2008 | Letsinger | |
| 7,363,252 B2 | 4/2008 | Fujimoto | |
| 7,376,839 B2 | 5/2008 | Carta et al. | |
| 7,380,279 B2 | 5/2008 | Prokupets et al. | |
| 7,600,129 B2 | 10/2009 | Libin et al. | |
| 7,616,091 B2 | 11/2009 | Libin | |
| 7,698,566 B1 | 4/2010 | Stone | |
| 7,706,778 B2 | 4/2010 | Lowe | |
| 7,716,486 B2 | 5/2010 | Libin et al. | |
| 7,730,126 B2 | 6/2010 | Crawford | |
| 7,775,429 B2 | 8/2010 | Radicella et al. | |
| 7,822,989 B2 | 10/2010 | Libin et al. | |
| 7,823,193 B2 | 10/2010 | Ritter et al. | |
| 7,873,989 B2 | 1/2011 | Karkas et al. | |
| 8,074,271 B2 | 12/2011 | Davis et al. | |
| 8,150,374 B2 | 4/2012 | Lowe | |
| 8,572,705 B2 | 10/2013 | Ritter et al. | |
| 8,578,472 B2 | 11/2013 | Davis et al. | |
| 2001/0018660 A1 | 8/2001 | Sehr | |
| 2002/0035515 A1 | 3/2002 | Moreno | |
| 2002/0143855 A1 | 10/2002 | Traversat et al. | |
| 2003/0023874 A1 | 1/2003 | Prokupets et al. | |
| 2003/0151493 A1 | 8/2003 | Straumann et al. | |
| 2003/0160681 A1 | 8/2003 | Menard | |
| 2003/0163686 A1 | 8/2003 | Ward et al. | |
| 2003/0179073 A1 | 9/2003 | Ghazarian | |
| 2003/0189096 A1 | 10/2003 | Markkanen et al. | |
| 2003/0190887 A1 | 10/2003 | Hook et al. | |
| 2003/0216143 A1 | 11/2003 | Rose et al. | |
| 2004/0017929 A1 | 1/2004 | Bramblet et al. | |
| 2004/0039916 A1 | 2/2004 | Aldis et al. | |
| 2004/0049675 A1 | 3/2004 | Micali et al. | |
| 2004/0050930 A1 | 3/2004 | Rowe | |
| 2004/0059590 A1 | 3/2004 | Mercredi et al. | |
| 2004/0078594 A1 | 4/2004 | Scott | |
| 2004/0083212 A1 | 4/2004 | Palmquist | |
| 2004/0117617 A1 | 6/2004 | Geller et al. | |
| 2004/0130437 A1 | 7/2004 | Stevens | |
| 2004/0153767 A1 | 8/2004 | Dolgonos | |
| 2004/0167881 A1 | 8/2004 | Masuka | |
| 2004/0177270 A1 | 9/2004 | Little et al. | |
| 2004/0180646 A1 | 9/2004 | Donley et al. | |
| 2004/0229560 A1 | 11/2004 | Maloney | |
| 2005/0033962 A1 | 2/2005 | Libin et al. | |
| 2005/0055562 A1 | 3/2005 | Guthery | |
| 2005/0055567 A1 | 3/2005 | Libin et al. | |
| 2005/0063027 A1 | 3/2005 | Durst, Jr. et al. | |
| 2005/0149443 A1 | 7/2005 | Torvinen | |
| 2005/0174214 A1 | 8/2005 | Ocana | |
| 2005/0178833 A1 | 8/2005 | Kisliakov | |
| 2005/0198318 A1 | 9/2005 | von Mueller et al. | |
| 2005/0271250 A1 | 12/2005 | Vallone et al. | |
| 2006/0049255 A1 | 3/2006 | von Mueller et al. | |
| 2006/0052091 A1 | 3/2006 | Onyon et al. | |
| 2006/0164235 A1 | 7/2006 | Gounder | |
| 2006/0165060 A1* | 7/2006 | Dua | G06Q 20/20 370/352 |
| 2006/0167871 A1 | 7/2006 | Sorenson | |
| 2006/0170533 A1 | 8/2006 | Chioiu et al. | |
| 2006/0182661 A1 | 8/2006 | Aquila | |
| 2006/0224901 A1 | 10/2006 | Lowe | |
| 2007/0067400 A1 | 3/2007 | Kawakami et al. | |
| 2007/0200665 A1 | 8/2007 | Studerus | |
| 2008/0107269 A1 | 5/2008 | Gehrmann et al. | |
| 2008/0163361 A1 | 7/2008 | Davis et al. | |
| 2008/0211620 A1 | 9/2008 | Willgert | |
| 2009/0088077 A1 | 4/2009 | Brown et al. | |
| 2009/0183541 A1 | 7/2009 | Sadighi et al. | |
| 2010/0042954 A1 | 2/2010 | Rosenblatt et al. | |
| 2010/0077466 A1 | 3/2010 | Lowe | |
| 2010/0106773 A1 | 4/2010 | Tsutazawa et al. | |
| 2010/0245033 A1 | 9/2010 | Sasakuma | |
| 2010/0287568 A1 | 11/2010 | Sundararaman | |
| 2011/0093928 A1 | 4/2011 | Nakagawa et al. | |
| 2011/0187493 A1 | 8/2011 | Elfstrom et al. | |
| 2012/0036575 A1 | 2/2012 | Davis et al. | |
| 2012/0114122 A1 | 5/2012 | Metivier | |
| 2012/0157058 A1 | 6/2012 | Lowe | |
| 2012/0221695 A1* | 8/2012 | Rose | G07C 9/00103 709/223 |
| 2012/0278901 A1 | 11/2012 | Bunter | |
| 2013/0093563 A1 | 4/2013 | Adolfsson et al. | |
| 2013/0212661 A1* | 8/2013 | Neafsey | G06F 21/45 726/6 |
| 2014/0013418 A1 | 1/2014 | Davis et al. | |
| 2014/0025408 A1 | 1/2014 | Ritter et al. | |
| 2014/0123317 A1 | 5/2014 | Sugihara | |
| 2015/0109098 A1 | 4/2015 | Singh | |
| 2015/0213247 A1 | 7/2015 | Davis et al. | |
| 2015/0213248 A1 | 7/2015 | Davis et al. | |
| 2015/0215322 A1 | 7/2015 | Davis et al. | |
| 2015/0220711 A1 | 8/2015 | Lowe | |
| 2015/0220721 A1 | 8/2015 | Davis et al. | |
| 2015/0220722 A1 | 8/2015 | Davis et al. | |
| 2015/0222622 A1 | 8/2015 | Lowe | |
| 2015/0222623 A1 | 8/2015 | Lowe | |
| 2015/0223066 A1 | 8/2015 | Lowe | |

(56) References Cited

U.S. PATENT DOCUMENTS

| | | |
|---|---|---|
| 2015/0223067 A1 | 8/2015 | Lowe |
| 2015/0288464 A1 | 10/2015 | Tanner et al. |

FOREIGN PATENT DOCUMENTS

| | | |
|---|---|---|
| EP | 1333409 | 8/2003 |
| EP | 1562153 | 8/2005 |
| EP | 1628255 | 2/2006 |
| EP | 1841166 | 10/2007 |
| FR | 2839833 | 11/2003 |
| JP | 2002-129792 | 5/2002 |
| KR | 10-2004-032311 | 4/2004 |
| WO | WO 02/096070 | 11/2002 |
| WO | WO 03/081934 | 10/2003 |
| WO | WO 2004/025545 | 3/2004 |
| WO | WO 2004/114190 | 12/2004 |
| WO | WO 2005/024549 | 3/2005 |
| WO | WO 2005/038728 | 4/2005 |
| WO | WO 2005/091516 | 9/2005 |
| WO | WO 2005/096651 | 10/2005 |
| WO | WO 2007/126375 | 11/2007 |
| WO | WO 2007/139909 | 12/2007 |
| WO | WO 2008/024162 | 2/2008 |
| WO | WO 2008/024320 | 2/2008 |
| WO | WO 2008/035115 | 3/2008 |
| WO | WO 2008/042302 | 4/2008 |

OTHER PUBLICATIONS

Joint Claim Construction Statement for Case No. SACV-14-00947-CJC (DFMx), Exhibit A of Petition for Inter Partes Review of U.S. Pat. No. 7,706,778, filed Jun. 18, 2015, 21 pages.
Declaration of Bruce Schneier in Support of Request for Inter Partes Review of the '778 Patent, dated Jun. 17, 2015, 77 pages.
Petition for Ineter Partes Review of U.S. Pat. No. 8,150,374, filed Jun. 18, 2015 64 pages.
Declaration of Bruce Schneier in Support of Request for Inter Partes Review of the '374 Patent, dated Jun. 17, 2015, 134 pages.
U.S. Appl. No. 14/668,464, filed Mar. 25, 2015, Davis et al.
U.S. Appl. No. 14/668,494, filed Mar. 25, 2015, Davis et al.
U.S. Appl. No. 14/668,507, filed Mar. 25, 2015, Davis et al.
U.S. Appl. No. 14/668,517, filed Mar. 25, 2015, Davis et al.
U.S. Appl. No. 14/668,531, filed Mar. 25, 2015, Davis et al.
U.S. Appl. No. 14/674,085, filed Mar. 31, 2015, Lowe.
U.S. Appl. No. 14/674,094, filed Mar. 31, 2015, Lowe.
U.S. Appl. No. 14/674,109, filed Mar. 31, 2015, Lowe.
U.S. Appl. No. 14/674,125, filed Mar. 31, 2015, Lowe.
U.S. Appl. No. 14/674,167, filed Mar. 31, 2015, Lowe.
Esato—"Nokia Launches NFC Shell for Mobile Payments" http://www.esato.com/news/article.php/id=436 (Feb. 25, 2005) (3 pages).
Indala—"Product Families" www.indala.com/products/index.html (Copyright 2004) (2 pages).
NFC Forum—"About Near Field Communication" http://www.nfc-forum.org/aboutnfc/ (Copyright 2005) (3 pages).
Nokia—"Use Cases" http://www.nokia.com (Copyright 2005) (2 pages).
Phillips Semiconductoers—"Near Field Communication PN511-Transmision module." (Feb. 2004) (18 pages).
International Search Report for International (PCT) Patent Application No. PCT/US06/15304, mailed Jun. 11, 2008.
Written Opinion for International (PCT) Patent Application No. PCT/US06/15304, mailed Jun. 11, 2008.
Official Action for Australian Patent Application No. 2006343377, dated Jun. 3, 2010.
Official Action for Canadian Patent Application No. 2,647,713 dated Nov. 20, 2012, 2 pages.
Official Action for U.S. Appl. No. 11/397,542, mailed Oct. 28, 2008.
Official Action for U.S. Appl. No. 11/397,542, mailed Mar. 31, 2009.
Official Action for U.S. Appl. No. 11/397,542, mailed Sep. 14, 2009.
Notice of Allowance for U.S. Appl. No. 11/397,542, mailed Feb. 18, 2010.
Official Action for U.S. Appl. No. 12/628,574, mailed May 26, 2011.
Notice of Allowance for U.S. Appl. No. 12/628,574, mailed Nov. 15, 2011 12 pages.
Official Action for U.S. Appl. No. 13/404,915, mailed Jun. 4, 2012 11 pages.
Official Action for U.S. Appl. No. 13/404,915, mailed Dec. 3, 2012 16 pages.
Official Action for U.S. Appl. No. 13/404,915, mailed Jun. 14, 2013 9 pages.
Examiner's Answer for U.S. Appl. No. 13/404,915, mailed Feb. 7, 2014 19 pages.
Notice of Allowance for Canadian Patent Application No. 2,647,713 dated Jul. 8, 2013, 1 pages.
Official Action for U.S. Appl. No. 14/674,125, mailed May 22, 2015 9 pages.
Official Action for U.S. Appl. No. 14/674,167, mailed Jun. 5, 2015 11 pages.
Extended Search Report for European Patent Application No. 06758515.8, dated Jul. 31, 2014, 5 pages.
Extended Search Report for European Patent Application No. 07113279.9, dated Dec. 7, 2011 6 pages.
Mjolsnes et al., "On-Line E-Wallet System with Decentralized Credential Keepers," Mobile Networks and Applications, 2003, 8:87-99.
Notice of Allowance for Australia Patent Application No. 2007203452, dated Mar. 21, 2012 3 pages.
Notice of Allowance for Canada Patent Application No. 2,596,561, dated Jun. 30, 2014 1 page.
Notice of Allowance for U.S. Appl. No. 11/778,145, mailed Sep. 20, 2011 10 pages.
Notice of Allowance for U.S. Appl. No. 13/274,863, mailed Jul. 25, 2013 7 pages.
Official Action for Australia Patent Application No. 2007203452, dated May 19, 2011 2 pages.
Official Action for Canada Patent Application No. 2,596,561, mailed Mar. 13, 2013 3 pages.
Official Action for U.S. Appl. No. 11/778,145, mailed May 26, 2011 20 pages.
Official Action for U.S. Appl. No. 11/778,145, mailed Nov. 18, 2010 20 pages.
Official Action for U.S. Appl. No. 14/017,065, mailed Apr. 17, 2015 21 pages.
Official Action for U.S. Appl. No. 14/017,065, mailed Sep. 30 2014 17 pages.
Official Action for U.S. Appl. No. 13/274,863, mailed Apr. 12, 2013 6 pages.
Official Action for U.S. Appl. No. 13/274,863, mailed Aug. 6, 2012 26 pages.

* cited by examiner

SYSTEM AND METHOD FOR REMOTELY ASSIGNING AND REVOKING ACCESS CREDENTIALS USING A NEAR FIELD COMMUNICATION EQUIPPED MOBILE PHONE

CROSS-REFERENCE TO RELATED APPLICATION

The present application is a continuation of U.S. patent application Ser. No. 13/404,915, filed Feb. 24, 2012, which is a continuation of U.S. patent application Ser. No. 12/628, 574, filed Dec. 1, 2009, now U.S. Pat. No. 8,150,374, which is a continuation of U.S. patent application Ser. No. 11/397, 542, filed Apr. 3, 2006, now U.S. Pat. No. 7,706,778, which claims the benefit of U.S. Provisional Patent Application Ser. No. 60/668,828, filed Apr. 5, 2005, the entire disclosures of which are hereby incorporated herein by reference.

FIELD OF THE INVENTION

The invention is directed generally to using mobile devices in an access control system. Specifically, a mobile device utilizing near field communications protocol (NFC) may be used for controlling access to assets, places, or things by having access credentials remotely assigned and revoked.

BACKGROUND OF THE INVENTION

Radio frequency IDs (RFIDs), like contactless smart cards, store credential information that can be used later to gain access to an asset. When presented to a reader/interrogator the smart card transmits the stored credential information for verification by the reader/interrogator. The reader/interrogator processes the credential information and determines if the smart card being presented is a valid smart card. If the reader/interrogator determines that the credential information on the smart card is valid then the reader/interrogator sends the initiates any number of actions allowing the holder of the smart card access to a particular asset.

NFC is a communication method that is showing great promise for communication between devices at short range. NFC may be regarded as the same protocol that is used by contactless smart cards working at 13.56 MHz. Several companies are in the process of announcing mobile phones that incorporate an NFC chip. The communication protocol of a typical NFC chip can be seen for instance in *Short Form Specification of the PN511-Transmission module, February* 2004 from Philips Semiconductors, which is herein incorporated by reference in its entirety.

The protocol used in NFC can vary depending on the mode that the chip and reader/interrogator are in. For example, if an active NFC mode is used, both a reader/interrogator and target are using their own radio frequency (RF) field to enable communication between each other. A reader/interrogator is powered to generate an RF filed of a particular frequency, for instance at 13.56 MHz. The target has its own power supply for digital processing and communications. When the target receives a communication from a reader/interrogator, the target uses its own power supply to generate another RF field to answer the reader/interrogator. Communications can occur back and forth between the reader/interrogator and target. Alternatively, if a passive NFC mode is implemented, the target answers to a reader/interrogator command in a load modulation scheme. The target is not powered to generate its own RF field. Rather, the target uses energy from the RF created by the reader/interrogator to create its RF field and reply to be sent back to the reader/interrogator.

If the NFC chip is coupled with a micro-processor, the chip may act like smart cards or the like where communication between a reader and card are performed to gain access to an asset. Typically a mobile phone includes a battery and the NFC chip can be powered by that battery. If the chip derives power from the mobile phone battery, the NFC chip may communicate with an reader/interrogator according to the active protocol described above. Alternatively, the NFC chip can communicate with a reader/interrogator in a passive mode. This will eliminate the need for the chip to be powered by the battery of a mobile phone, which may increase the life of the battery.

In most global system for mobile communication (GSM) devices, e.g., mobile phones, there is a Subscriber Identification Module (SIM) that is a secure memory containing all of the owner's account information, as well as space available for additional applications such as an electronic purse for e-commerce. This memory is accessible from outside of the mobile device, i.e., remotely. Mobile devices carry a secure memory much like smart cards or the like and the new applications in NFC protocols enable the mobile device to perform functions like smart cards. The ability to have a mobile device also operate as a smart card creates a variety of new applications for the device.

Typical smart cards are a small, usually credit card shaped, device that contains at least a memory device for storing information and a transceiver to communicate with a reader/interrogator. The reader/interrogator communicates through the transceiver on the smart card to access the stored information. The reader/interrogator may simply read the information, load the information into the memory device or modify existing data in the memory device. For example, if the owner of a smart card uses a smart card containing financial information to make a purchase, the reader/interrogator can read the information including the owner's identity and the availability of funds. The reader/interrogator can also deduct the purchase amount from the available funds if it has writing capabilities. Further, the reader/interrogator can store transaction data on the smart card including the time and location of the transaction in addition to the identity of the reader/interrogator.

Smart cards have a variety of uses and can be utilized in any transaction that involves the exchange of data or information between individuals and an institution. For example, smart cards can be used to store information including medical records, financial information, vehicle maintenance information, pet information, and a virtually limitless variety of other information traditionally printed on paper or plastic or stored on cards having a magnetic stripe or an optical bar code. Smart card technology has been particularly useful in banking systems and other financial transaction systems. Furthermore, smart cards have been widely used in access control systems. For example, an reader/interrogator may control doors that provide access to particular assets. The reader/interrogator only allows qualified individuals carrying smart cards, with proper credentials loaded thereon, access through control doors.

In a conventional access control system, the door reader/interrogators positioned at ingress/egress points are connected to a control panel. This control panel is kept up to date with the authorized codes corresponding to persons with authorized access to the location. When activity occurs, the control panel is updated with the activity information. For example, if the activity related to access gained through a particular door, the door and potentially the person who gained access are stored in the control panel log. Also, if the activity related to a financial transaction, the information relating to the transaction including amount and who performed the transaction are sent and stored at the control panel. There are, however, circumstances in which control panels associated with remote locations that are not regularly updated. If a person's status changes from authorized to unauthorized, it might take a relatively long time for the control panel associated with a remote door to get the message and bar the credential associated with this person from access. Furthermore, typical access control systems are limited in that control panels, either localized or central, are the only source that tracks, logs, and monitors the activity associated with a given access point. When entries take place in these conventional access control systems, the information is sent to the control panel where it stays. If someone would like to be aware of activity associated with the access control system they are usually required to physically go to the control panel itself.

SUMMARY OF THE INVENTION

It is thus one aspect of the present invention to provide a system and method that automatically updates credentials on a mobile device immediately after authorization changes have been made. In one embodiment, the system and method provides a controller (e.g., a control panel, number of control panels, host computer, number of host computers, server, and the like), a plurality of readers, and a plurality of mobile devices. Each of the plurality of mobile devices has a memory associated with them that stores credential information. The readers are typically associated with a particular asset (e.g., a door permitting access to a secure room, a computer permitting access to secure information, a lock permitting access to a safe, etc.). The readers communicate with the mobile devices to determine if the credential information stored on the memory of the mobile device permits the person using the mobile device to access a particular asset. Credential information is verified at the reader then transmitted to the controller in order to notify security personnel or the like about the activity that has just taken place at the reader. When credential information is changed at the controller (e.g., access rights for a particular user of a mobile device have been partially or fully revoked, updated, enabled, augmented, added, etc.), that changed information is relayed to the mobile device via a communication network. The memory of the mobile device is then updated to reflect the change that was logged at the controller.

As used herein, a "credential" or "credential information" is any data, set of data, encryption scheme, key, and/or transmission protocol used by a particular mobile device to verify its authenticity with a reader/interrogator.

In another embodiment of the present invention, a system and method for periodically updating and/or enabling the credentials of a mobile device and/or reader is provided. Specifically, the controller updates the credential information of a mobile device on a predetermined periodic basis. Every predetermined period (e.g., every second, minute, hour, day, etc.) the credentials associated with one or a population of mobile devices is updated. At the same time, in one embodiment of the invention, the information relating to the updated credentials is relayed to the readers so that when a valid mobile device is presented to a reader, the reader is aware of the updated credentials and can assess the validity of the mobile device appropriately. Alternatively, or in addition to updating the mobile device credentials, the mobile devices may require a periodic enablement of their credentials in order to maintain their validity. For example, the credential information associated with a particular mobile device may not change, but the information will be erased, expire, or the mobile device may not be allowed to transmit its credential information if it does not receive the periodic enablement messages from the controller. Therefore, when a user is no longer permitted access to a particular asset, the automatic enablement messages are not sent to his/her mobile device. If a user has had their credentials revoked or changed for whatever reason, they may attempt to shield their mobile device from receiving any authorization disabling messages. By changing the logic of the mobile device such that the credentials periodically time out unless an enabling message is received from the control panel, attempts to maintain or prolong authorized credentials by shielding mobile devices from a disabling message are thwarted.

In yet another embodiment of the present invention, a system and method for relaying information associated with activities detected at a reader or set of readers to a mobile device is provided. Rather than keeping a log of the activity information only at the controller, selected mobile devices can receive the activity information from the controller. In a residential lock situation, the system can send a Short Message Service (SMS) message/signal or the like to the mobile device of the homeowner. A homeowner at work may want to know when a child, housekeeper, or other person enters and exits their house. The selected mobile device could retrieve the message employing a number of other methods. For example, records of activities at a particular reader can be logged at that reader. A mobile device authorized to recover the activity log could be presented to the reader and the log file could be transferred to and displayed on the mobile device. Likewise, the reader (or the mobile device) could send the log file to a computer via email using various types of text messaging protocols.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

The present invention is generally directed toward a system and method for using mobile communication devices as personal credential verification devices. Specifically, the present invention utilizes communication techniques and protocols to automatically and remotely update credential information associated with one or a set of mobile devices.

Figure 1:
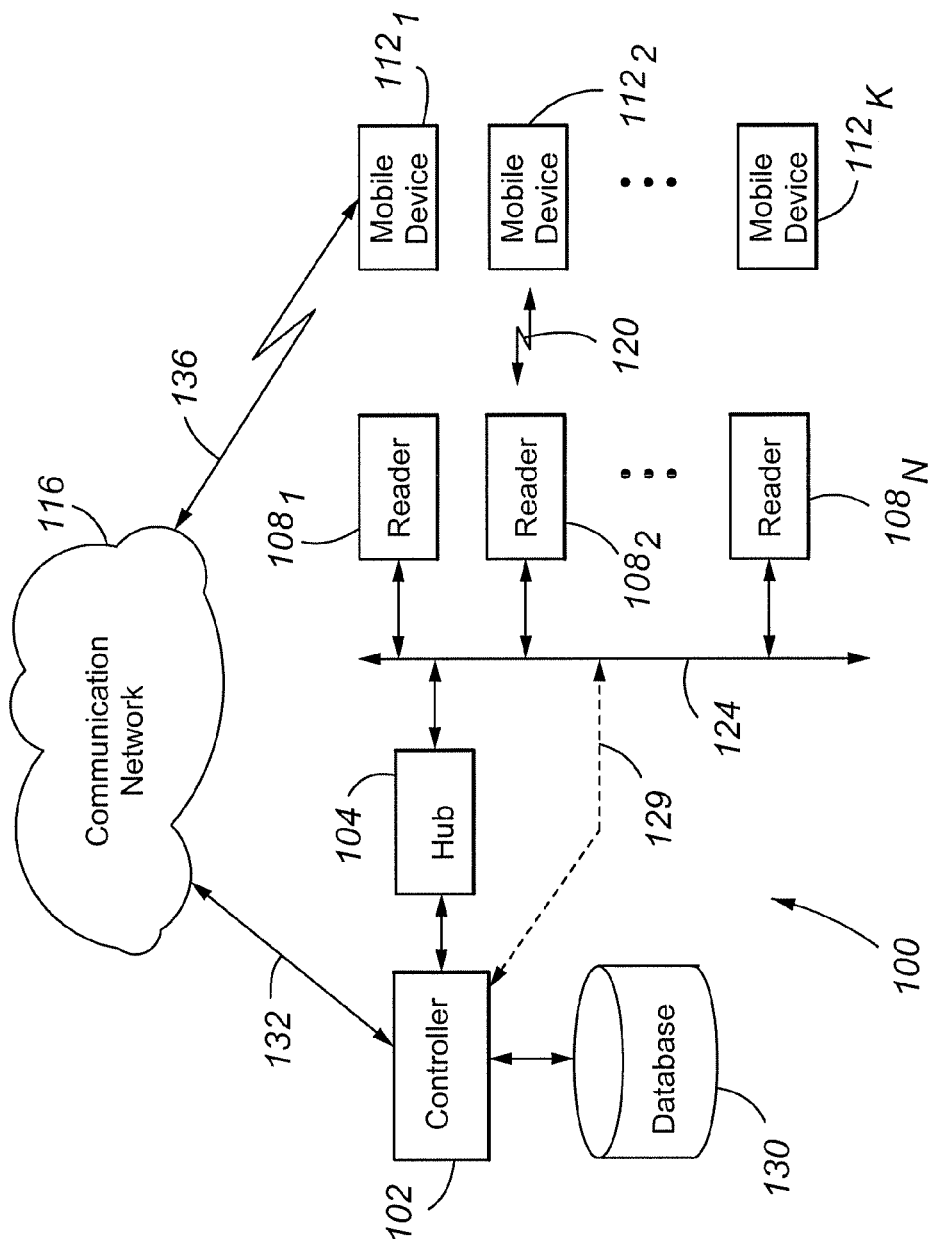
FIG. 1 is a diagram depicting an exemplary system for authenticating mobile devices and remotely updating credentials associated with the mobile devices in accordance with embodiments of the present invention.

FIG. 1 depicts an access network 100 used to verify the identity of at least one mobile device. In one embodiment of the present invention, the system 100 comprises a controller 102, a hub 104, a plurality of readers $108_{1-n}$, and a plurality of mobile devices $112_{1-k}$ such that n and k are integers wherein n and k are greater than or equal to one, and typically k is greater than n. The plurality of readers $108_{1-n}$ may include readers 108 of the same type, as well as readers of different types. For example, a subset of the plurality of readers $108_{1-n}$ may be legacy readers (e.g. readers using older transmission protocols). Whereas another subset of the plurality of readers $108_{1-n}$ may be newer readers utilizing improved and/or more secure protocols.

In the depicted embodiment, the readers 108 are coupled to the controller 102 via the interconnecting hub 104 through interfaces 124 and 128. In an alternate embodiment, the readers 108 may be directly coupled to the respective inputs/outputs of the controller 102 via interface 129. Interfaces 124 and 128 between the readers 108, the hub 104, and the controller 102 and interface 129 are generally bi-directional interfaces, which may selectively be implemented in a form of wired, wireless, fiber-optic communication links, or combinations thereof. Even though the interfaces 124, 128, and 129 are depicted as bi-directional interfaces, one of skill in art can appreciate that the interfaces 124, 128, and 129 may be implemented as unidirectional interfaces that use a unidirectional communication protocol, for example, the Wiegand protocol.

As can be appreciated by one of skill in the art, the interfaces 124, 128, and 129 may be implemented utilizing buses or other types of connections. For example, the I/O ports may be one or more of a USB port, parallel port, serial port, Small Computer Systems Interface (SCSI) port, modem, Ethernet, and/or an RF interface. The protocols used to communicate between the controller 102 and the readers 108 may include one or more of the TCP/IP protocol, RS 232, RS 485, Current Loop, Power of Ethernet (POE), Bluetooth, ZigBee, GSM, WiFi, and other communication methods and protocols known in the art.

Bi-directional RF interfaces 120 between a reader 108 and a mobile device 112 are automatically established when the mobile device 112 is placed within an active zone (not shown) of the interrogating reader 108. The active zone of the reader 108 is defined as a three dimensional space where the intensity of RF signals emitted by the reader exceeds a threshold of sensitivity of the mobile device 112 and the intensity of RF signals emitted by the mobile device 112 exceeds a threshold of sensitivity of the reader 108. The interface 120 shown can be between one or a number of readers 108 and one or a number of mobile devices 11. Furthermore, the interface 120 may utilize known methods and protocols including NFC protocol, Infra Red communication methods, Bluetooth, ZigBee, GSM, WiFi, and/or other protocols known to those of skill in the art.

The controller 102 may be a general-purpose computer adapted for multi-task data processing and suitable for use in various settings including, but not being limited to, business, commercial, residential, and industrial settings. Examples of suitable types of controllers 102 include, but are not limited to, a control panel, a number of control panels, a host computer, a processor, a server, combinations thereof, and other controllers known to those of skill in the art. A memory of the controller 102 comprises software program(s) containing a database of records for the access system 100. Alternatively, a database 130 may be separated from the controller 102 as depicted in FIG. 1. The database 130, whether integral to the controller 102, separate from the controller 102, or both, maintains records associated with the readers 108, mobile devices 112 and their respective holders or users, algorithm(s) for acquiring, decoding, verifying, and modifying data contained in the mobile device, algorithm(s) for testing authenticity and validity of the mobile devices 112, and algorithm(s) for implementing the results of these tests. Specific configurations of the controller 102 are determined based on and compliant with computing and interfacing capabilities of the readers 108 and/or the hub 104. As used herein, in reference to an individual or an object associated with a mobile device 112, the terms a "holder" and a "user" are used interchangeably.

Each reader 108 is adapted for exchanging information with the controller 102 and for requesting data from the mobile device 112 to verify the authenticity of the mobile device. Typically, a reader 108 is associated with a particular asset (e.g., a door protecting access to a secure room, a computer lock protecting sensitive information or computer files, a lock on a safe, and the like). In one embodiment, upon verification of credential information stored on the mobile device 112, the reader 108 generates signals facilitating execution of the results of interrogating the mobile device (e.g., engages/disengages a locking mechanism, allows/disallows movement of a monitored article, temporarily disables itself, activates an alarm system, provides access to a computer system, provides access to a particular document, and the like). Alternatively, the controller 102 may generate such signals.

In addition to being proximity readers (e.g. readers that verify authenticity of smart cards, mobile devices and the like) the readers 108 may also have additional functionality. The readers 108 may include a keypad or other user input devices for receipt of additional user known passwords, contact card identification devices, and biometric authentication devices including voice recognition, retina scanners, finger print analyzers, facial feature analyzers, and the like.

In accordance with embodiments of the present invention, a stand-alone reader 108 may be utilized to perform the functionality of both the reader 108 and the controller 102. This stand-alone reader 108 may include, or have access to, the database 130 that contains data used to determine the authenticity of a mobile device 112 and/or algorithm(s) used to make the determination of authenticity of the mobile device 112. A determination of authenticity for a mobile device 112 is made at the receiving point rather than having to transmit data across a network from the reader 108 to a controller 102 in order to make a determination of authenticity. The stand-alone reader is further operable to execute instructions based upon the analysis of the mobile device 112.

A user typically carries the mobile devices 112 in order to verify his/her identity to a reader 108. Acceptable mobile devices 112 include, mobile cellular phones, personal digital assistants (PDAs), Blackberrys™, or any other mobile communication device that can be enabled for use in the access system 100 described. Essentially, the mobile device 112 can perform functions associated with typical mobile devices and can also act like a smart card, RFID, or other type of identification device. Typical identification devices utilize various protocols to communicate their credential information to a reader in order to gain access to a particular asset. The mobile devices 112, in accordance with embodiments of the present invention, are enabled to communicate with readers 108 in a similar fashion to that of smart cards and the like.

In accordance with embodiments of the present invention, the controller 102 is able to communicate with at least one of the plurality of the mobile devices 112 using a communication network 116. The communication network 116 utilized may be a conventional mobile radio network, for example, a GSM network, a Digital Cellular System (DCS), or Personal Communications Systems (PCS). The interface 132 may be a wired or wireless interface allowing the controller 102 to communicate with various other entities connected to the communication network 116. The mobile device 112 communicates with the communication network 116 via interface 136. The communication network 116 provides a way for the controller 102 to automatically notify and/or update information to the mobile devices 112 related to the access system 100. Additionally, the communication network 116 allows mobile devices 112 to communicate with each other.

Figure 2:
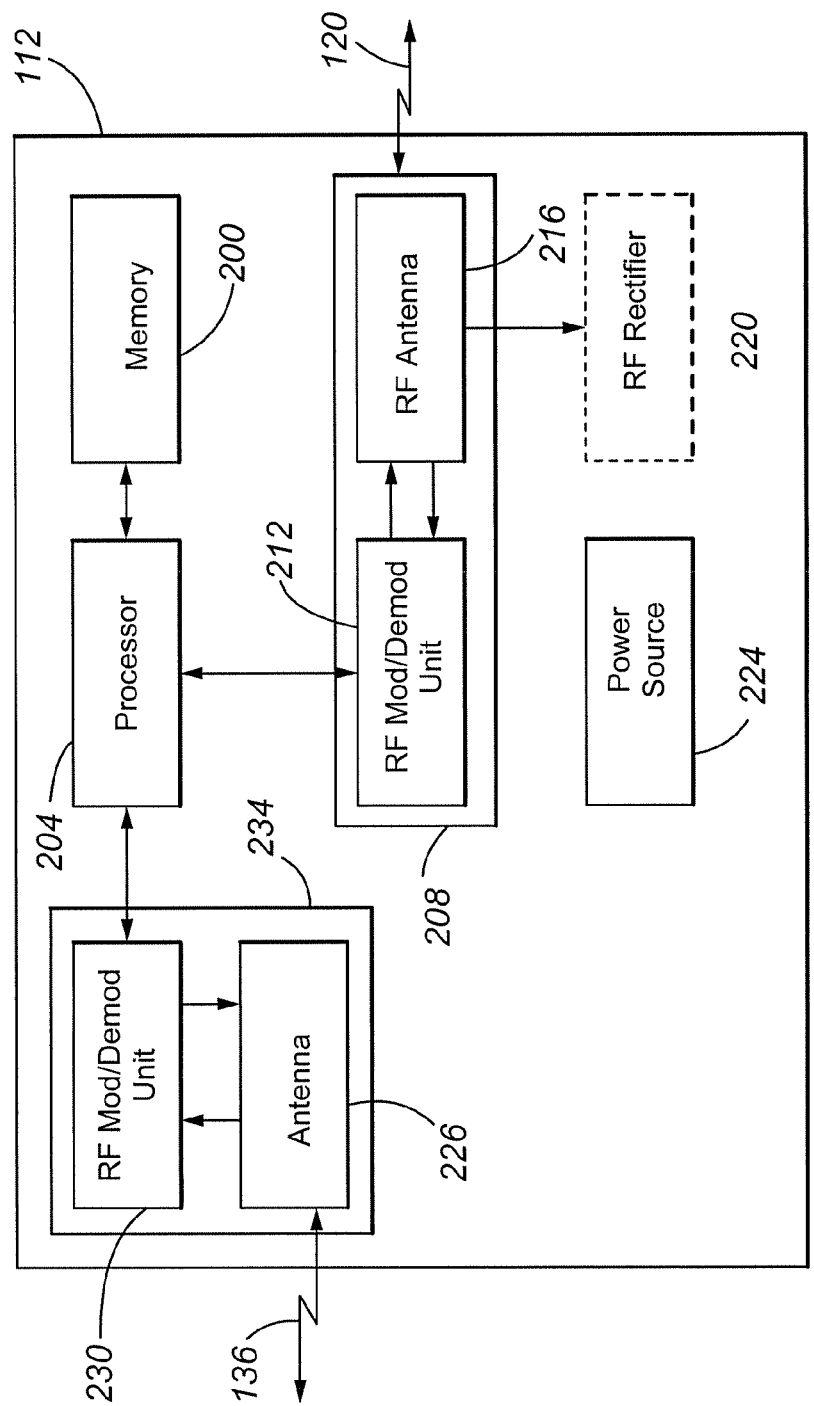
FIG. 2 is a block diagram depicting a mobile device in accordance with embodiments of the present invention.

Referring now to FIG. 2, an exemplary mobile device 112 will be described in accordance with embodiments of the present invention. In the depicted embodiment, the mobile device 112 comprises a memory 200, a processor 204, an RF receiver/transmitter 208 including an RF modulation/demodulation unit 212 and an RF antenna 216 for communication with a reader 108, an RF receiver/transmitter 230 including an antenna 226 and an RF modulation/demodulation unit 230 for communication with the communication network 116, an optional RF rectifier 220, and a power source 224. The processor 204 (e.g., an application specific integrated circuit (ASIC), microprocessor, programmable controller, or the like) uses bi-directional interfaces to communicate with various other parts of the mobile device 112.

One or more of the above-noted parts of the mobile device may be located on a subscriber identification module (SIM) card, which identifies the user in the communication network 116. SIM cards are already utilized now in GSM, DCS, or PCS mobile apparatus, among other things. Also, the SIM card may be either a full-sized card or a plug-in card; it is connected to the mobile device through a contact region (not shown) on the surface of the card. Other card formats, as well as contact lists SIM cards, may, however, likewise be used within the scope of this invention. U.S. Pat. No. 6,859,650 to Ritter, which is herein incorporated by this reference in its entirety, describes using a SIM card located in a mobile device and an interface to communicate with external devices, without use of a mobile radio network.

As can be seen in FIG. 2, the mobile device 112, in one embodiment, communicates with external devices via two bi-directional interfaces 120 and 136. For example, the interface 120 where the RF antenna 216 transmits RF signals through free-space to be received by the reader 108. The reader 108 has a transceiver mounted thereon to receive the RF signals transmitted by the mobile device 112. The RF antenna 216 used by the mobile device 112 to create interface 120 may be a coil made by winding of a wire, by printing or etching of a conductor film, or with strip lines. Depending on the application, a transmission frequency, for instance, of 125 kHz, 13.56 MHz, 400 MHz or 5.2 GHz is used, the applied frequency also being dependent on the data transmission where needed. A frequency of about 13.56 MHz is preferred. However, in order to ensure compatibility with the readers 108, various other frequencies may be used. Through interface 120, the mobile device 112 and the reader 108 can exchange data and programs with each other without contact and without making use of the communications network 116. As noted above, the interface 120 is created when the mobile device 112 enters an active region of a reader 108.

The memory 200 of the mobile device 112 generally comprises at least one array of non-volatile memory cells, e.g., static random access memory (SRAM) cells or Flash Memory Cells, among other types of non-volatile memory cells. The memory 200 may also comprise at least one array of dynamic random access memory (DRAM) cells. Therefore a content of at least a portion of the memory 200 may be pre-programmed and write protected thereafter, whereas the content of other portions of the memory 200 may be selectively modified and/or erased by the controller 102 and/or the reader 108.

The mobile device 112, according to embodiments of the present invention, is used as an identification device. Identification information is preferably loaded into a secure area of the memory 200 where it can be accessed by the processor 204 to communicate to readers 208 via interface 120. Information loaded on the memory 200 may include credential information of the user of the mobile device 112, for instance, unique IDs, manufacture IDs, passwords, keys, encryption schemes, transmission protocols, and the like. Additionally, the memory 200 may contain executable functions that are used by the processor 204 to run other components of the mobile device 112. When presented to a reader 108, the RF antenna 216 typically receives interrogating signals via interface 120. The interrogating signals are in the form of RF signals produced by the reader 108.

In accordance with embodiments of the present invention, the memory 200 may further comprise self-authenticating data and/or functions. Examples of self-authenticating data include, but are not limited to, assets the mobile device 112 has access to, times of allowed access to each asset, and other data that can assist the mobile device in determining if it is eligible to gain access to a particular asset. The self-authenticating functions use the self-authenticating data to enable the mobile device 112 to make a determination of its own access rights with respect to an asset.

A mobile device 112 that determines its own access rights and permissions is typically referred to as a smart mobile device. In operation, a "smart" mobile device 112 is presented to a reader 108. The reader 108 is associated with one or more assets and the reader 108 is the gatekeeper of those assets. The reader 108 contains information about its associated assets and usually time of day information. Upon presentation of the mobile device 112 to the reader 108, the reader 108 supplies the asset information and time of day information to the mobile device 112. The mobile device 112 then analyzes the asset information and time of day information using its self-authenticating data. The mobile device 112 then makes a determination whether it is allowed to access the given asset (e.g., whether the holder of the mobile device 112 can have access to a room behind a door, a bank account, computer files, etc.) If the mobile device 112 determines that it is allowed access to the particular asset, then it sends a signal back to the reader 108 indicating that validation of the mobile device 112 has been confirmed and access should be granted. Upon confirmation of validation of the mobile device 112, the reader 108 will unlock the door, access the bank account, permit access to the computer files, or perform the requisite steps to grant access to the holder of the mobile device 112. If the mobile device 112 determines that it is not allowed access to the particular asset, then it can either do nothing or send a signal back to the reader 108 indicating that validation of the mobile device 112 was not confirmed and access should not be granted.

Upon the receipt of this signal, the reader 108 may perform no action, generate a message indicating that access was not granted, sound an alarm, or perform some other sort of action in accordance with denying the holder of the mobile device 112 access to the asset.

In operation, the reader 108 and the mobile device 112 use pre-programmed communication protocols. To increase the probability of error-free reception, the same messages may redundantly be repeated a pre-determined number of times or during a pre-determined timed interval. The interrogating reader 108 generates an interrogating RF signal. The interrogating RF signal of the interrogating reader 108 (or, if the protocol used by the mobile device 112 is an active protocol, RF signals produced by the mobile device 112) is received by the RFID antenna 216 and is forwarded to the modulation/demodulation unit 212 that in turn demodulates the RF signal and provides the demodulated signal for processing to the processor 204. Upon receipt of the RF signal by the processor 204, the memory 200 is accessed and relevant credential information is retrieved from the memory 200 by the processor 204. The retrieved credential information is then passed on to the modulation/demodulation unit 212 where it is modulated and sent to the RF antenna 216. The RF antenna 216 provides the modulated signal back to the reader 108 via interface 120. At the reader 108 or controller 102 the credential information is processed to determine the validity of the mobile device 112.

The RF signals generated by the reader 108 inherently contain electromagnetic energy. The signals can be sent to the optional RF rectifier 220 and the energy from those signals can be converted into energy to run various components of the mobile device 112. A power source 224 is also available to supply power to any other component of the mobile device 112 depicted or not depicted.

In accordance with embodiments of the present invention, the RF receiver/transmitter 234 for communication with the communication network 116 receives update signals (or other communication signals) from the communication network 116. In the event that the signal received by the antenna 226 is an update signal from the controller 102, the update signal is sent from the antenna 226 to the RF modulation/demodulation unit 230 where the signal is demodulated. The demodulated signal is sent to the processor 204, which then updates the memory 200 based on the update signal. The RF receiver/transmitter 230 also allows the mobile device 112 to communicate with other devices connected to the communications network 116.

Figure 3:
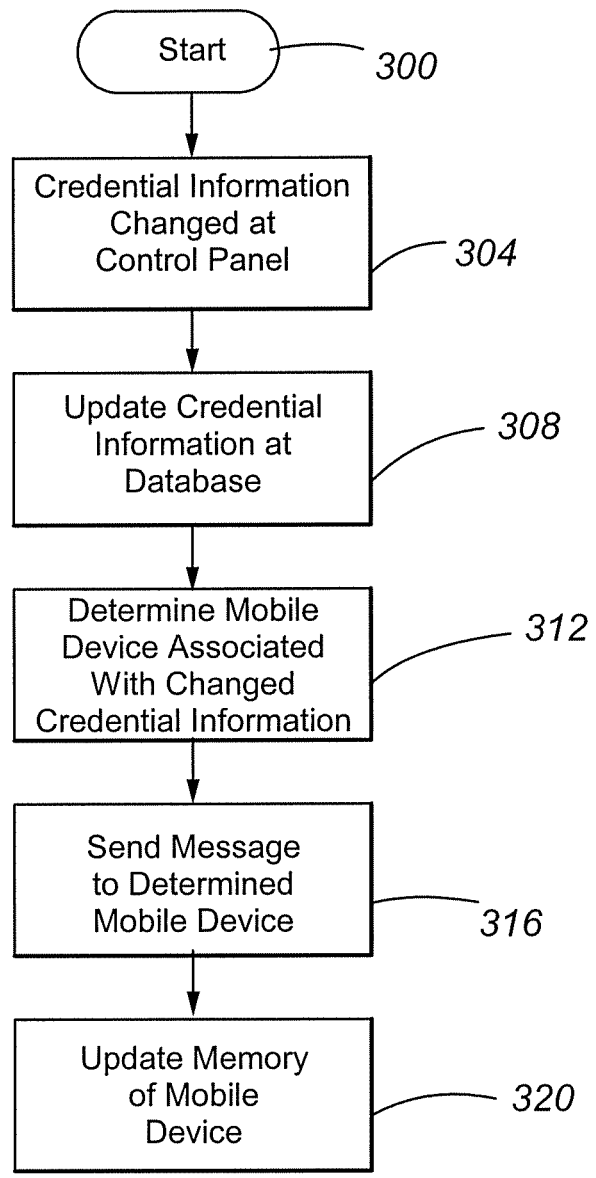
FIG. 3 is a flow chart depicting a method of remotely updating credentials associated with a mobile device in accordance with embodiments of the present invention.

Referring now to FIG. 3, a method of automatically and remotely updating credential information on a mobile device 112 will be described in accordance with embodiments of the present invention. The method begins at step 300 then proceeds to step 304 where credential information is changed at the controller 102. As noted above, credential information can include any data, set of data, encryption schemes, keys, transmission protocol, and the like, used by a particular mobile device 112 to verify its authenticity to a reader 108. Altering, modifying, enabling, disabling, revoking, adding, and updating any portion of the credential information may effect a change in the credential information. The credential information changed at the controller 102 is then updated at the database 130 in step 308. Thereafter, in step 312, information is retrieved from the database 130 by the controller 102 relating to what mobile device the changed information was associated with. The mobile device corresponding to the changed information is then identified as the target device. For example, if the access rights of one user have been modified, then the mobile device 112 associated with that user is the only mobile device 112 that needs to have its respective memory 200 updated, and thus the single mobile device 112 is the targeted mobile device 112. Alternatively, a change may relate to a number of mobile devices 112 and each device will need to receive the updated information on its respective memory 200. Thus each mobile device 112 will become a targeted device.

Once a targeted device is determined in step 312, a message is sent from the controller 102 to the determined (targeted) mobile device 112 via the communication network 116 in step 316. That information is received at the mobile device 112 through interface 136 by the antenna 226 that forwards this information to the RF modulation/demodulation unit 230 where the signal is demodulated. The RF modulation/demodulation unit 230 then sends the demodulated update signal to processor 204. The processor updates the memory 200 to reflect the change that was made at the controller 102 in step 320.

Figure 4:
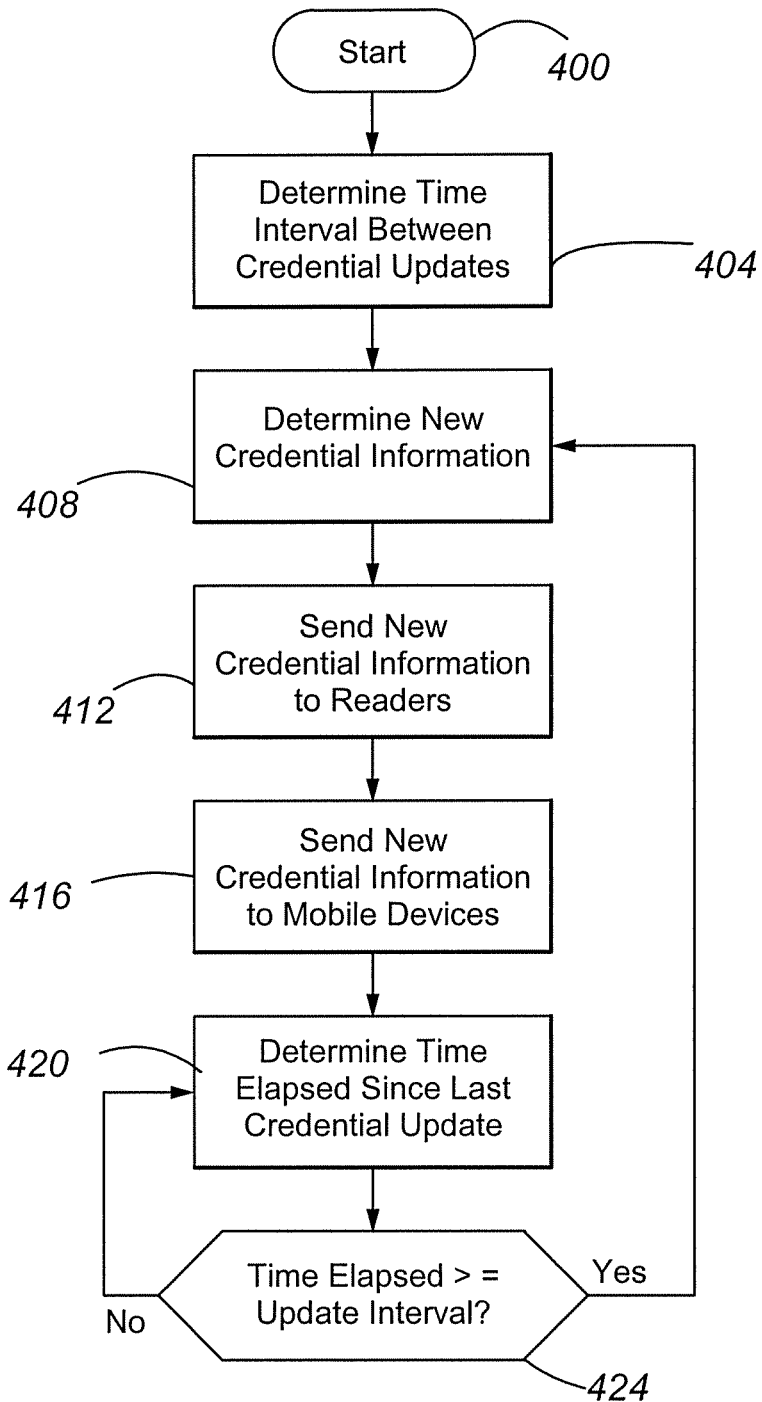
FIG. 4 is a flow chart depicting a method of periodically updating credentials associated with a mobile device in accordance with embodiments of the present invention.

Referring now to FIG. 4, another method of updating, enabling, and/or revoking the credentials of a mobile device 112 will be described in accordance with embodiments of the present invention. The method starts at step 400 and proceeds to step 404 where a time interval between credential updates is determined. The time period may vary depending upon the requirements and security needs of the system 100. For example, the interval may be set to update credentials every second, minute, hour, day or a variation thereof. In step 408, new credential information is determined. As noted above, the new credential information may relate to one or a number of mobile devices 112. In step 412, the new credential information is sent to the readers 108. Specifically, the readers 108 need to be made aware of changes of credential information if the changes are related to transmission protocols, keys, password changes, and the like. In step 416, the new credential information is sent to the respective mobile devices 112. This process is performed to ensure, for example, only mobile devices that are in communication with the communication network 116 have their credentials updated. Typically, when a user is de-enrolled from an access list, a message will be sent via a communication from the controller 102 to the mobile device 112 to revoke the associated credential information from the memory 200. A message is sent to the mobile device 112 immediately when that user is de-enrolled and therefore any attempts to gain access to the system 100 will be denied.

If the user who is no longer authorized to gain access to the system 100 intends to create problems, he/she might try to prevent the memory 200 in his/her phone from being de-authorized thereby keeping his/her access credentials on the mobile device 112. One way a person might do this would be by switching his/her phone off or otherwise shield it from the incoming messages by disabling the antenna 226 or tampering with interface 136. Thereafter he/she may only turn on and expose the mobile device 112 immediately prior to trying to gain access to an asset through reader 108. In one embodiment of the present invention, a signal (i.e., an SMS signal) periodically transmitted to the mobile device 112 is required to keep the respective credentials active. Changing the system 100 logic so that the mobile device's 112 credentials time out periodically thwarts these attempts to stop a mobile device 112 from receiving a disable message. If the mobile device 112 does not receive an enabling message, then the credential information stored thereon will become obsolete.

In embodiments employing a smart mobile device 112, the periodically transmitted message may be required to keep the self-authenticating data and/or functions active and up to date. Essentially, a database of self-authenticating data may have a time out function such that after a predetermined amount of time, the self-authenticating data expires and erases itself This way when a smart mobile device 112 is presented to a reader 108, it will not be able to validate its own access rights and thus will not be able to grant itself access to the asset associated with the given reader 108. The self-authenticating data may also be dynamically changing, thus if the mobile device 112 does not receive the updated version of the authenticating data, it will not be able to validate its own access rights.

Other functions of a mobile device 112 may also require periodic update/enabling signals in order to allow the smart mobile device 112 to validate its own access rights. For example, communications protocols or communication frequencies between a reader 108 and a mobile device 112 may also periodically change. If the mobile device 112 does not receive the updated communications directions, it will not be able to communicate properly with the reader 108, thus it will not be able to gain access to a particular asset.

An alternative embodiment would be to change protocols related to the communication interface 120. The changes could be sent via a message across the communications network 116 to the mobile device 112 such that the mobile device 112 is aware of the rolling or constantly changing credential information. For example, rolling access codes and keys may be applied to the readers 108 and the mobile devices 112. Any mobile device that is not in communication with the communication network 116 will not be updated with these rolling codes and will therefore not be able to be properly validated by reader 108.

In step 420, the amount of elapsed time since the last credential update is determined and if this time is determined to be greater than or equal to the determined update interval in step 424, the method goes to step 408 and new credential information is determined. However, if the time elapsed is not greater than the update interval, the process repeats step 420 until the periodic threshold is reached.

Figure 5:
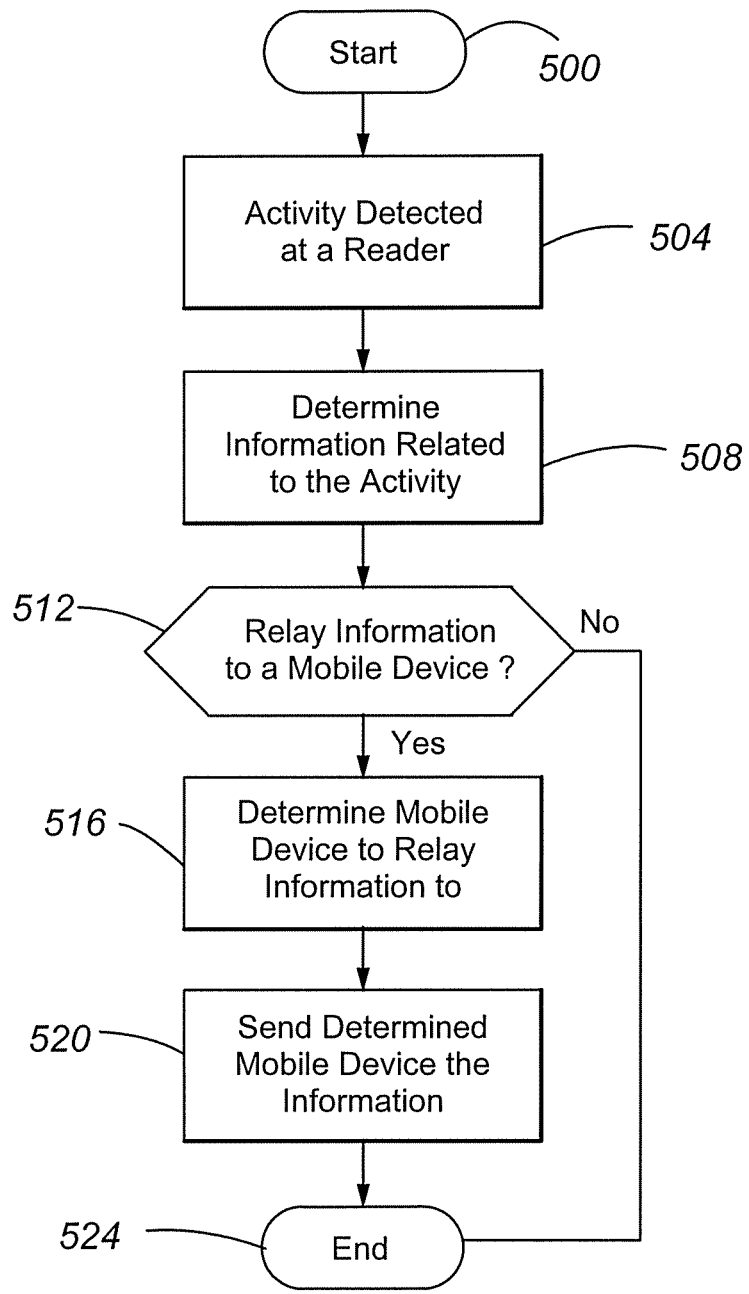
FIG. 5 is a flow chart depicting a method of relaying access activity in an exemplary system to a mobile device in accordance with embodiments of the present invention.

Referring now to FIG. 5, a method of relaying information relating to activities in an access system will be described in accordance with at least some embodiments of the present invention. The process starts at step 500 and then proceeds to step 504 where activity is detected at a reader 108. Information related to that activity is determined in step 508 and potentially logged. The information may be stored at reader 108 and/or sent to controller 102 to be stored in database 130. Thereafter, it is determined if a mobile device 112 is enabled to receive information about the activity that has just occurred in step 512. If there is a mobile device 112 enabled to receive information, the identity of that mobile device 112 is determined in step 516 by the controller 102, using a comparison of access rights and mobile device identities in the database. Otherwise, the logged information is not sent to any mobile device and the method ends at step 524. Once the enabled mobile device(s) 112 is determined in step 516, information relating to the activity is sent to the enabled mobile device(s) 112 in step 520.

As noted above, the information relating to the activity may be stored at the reader 108 and logged there. An enabled mobile device 112 may be presented to reader 108 and the log file of activities that have occurred at that particular reader 108 may be relayed to the enabled mobile device 112 in step 520. The information may also be sent to the mobile device via communications network 116 from the controller 102. Messages may be sent using an SMS message or other types of text messages known in the art. Additionally, the message may be sent via a voice recording to the mobile device 112 where the user of the mobile device can listen to an audio message rather than viewing a digital message.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of operating a physical access control system associated with a physical access point to a secure asset, comprising:
   receiving, at a server system, an indication that a reader operatively coupled to the physical access point has conducted an interaction with a first mobile device, the interaction comprising a transmission, by the first mobile device, of credential information to the reader, the physical access point comprising a lock;
   obtaining, with the server system, information related to the interaction between the reader and the first mobile device, the information related to the interaction comprising one or more of a date or a time corresponding to access to the secure asset;
   identifying, with the server system, a second mobile device that is different from the first mobile device and enabled to receive interaction information relative to the reader; and
   routing, with the server system, the obtained information to the second mobile device via a mobile communications network.

2. The method of claim 1, wherein the reader communicates the obtained information to the server system via the mobile communications network.

3. The method of claim 1, wherein the server system obtains the information related to the interaction via the mobile communications network.

4. The method of claim 1, wherein the interaction corresponds to the reader granting access to a holder of the first mobile device.

5. The method of claim 1, wherein the obtained information is communicated to the second mobile device via email.

6. The method of claim 1, wherein the obtained information is communicated to the second mobile device via a Short Message Service (SMS) message.

7. The method of claim 1, wherein the obtained information is communicated to the second mobile device via TCP/IP.

8. The method of claim 1, wherein the interaction corresponds to a failed authentication between the reader and the first mobile device.

9. The method of claim 1, wherein the interaction corresponds to a key failure.

10. The method of claim 1, wherein the obtained information includes location information describing a location of the interaction.

11. The method of claim 1, wherein the first mobile device is associated with a first user and the second mobile device is associated with a second user different from the first user.

12. The method of claim 1, wherein obtaining, with the server system, the information related to the interaction comprises:
obtaining the information related to the interaction from at least one of the reader or the first mobile device.

13. The method of claim 1, wherein the information related to the interaction includes one or more of a data or time corresponding to access to the secure asset.

14. The method of claim 1, wherein the physical access point to the secure asset includes a lock associated with the physical access point.

15. A system of operating a physical access control system associated with a physical access point to a secure asset, comprising:
a controller that is configured to perform operations comprising:
receiving an indication that a reader operatively coupled to the physical access point has conducted an interaction with a first mobile device, the interaction comprising a transmission, by the first mobile device, of credential information to the reader, the physical access point comprising a lock;
obtaining information related to the interaction, the information related to the interaction comprising one or more of a date or a time corresponding to access to the secure asset;
identifying a second mobile device that is different from the first mobile device and enabled to receive interaction information relative to the reader; and
routing the obtained information to the second mobile device via a mobile communications network.

16. The system of claim 15, wherein the interaction corresponds to the reader granting access to a holder of the first mobile device.

17. The system of claim 15, wherein the obtained information is communicated to the second mobile device via email.

18. The system of claim 15, wherein the obtained information is communicated to the second mobile device via a Short Message Service (SMS) message.

19. The system of claim 15, wherein the obtained information is communicated to the second mobile device via TCP/IP.

20. The system of claim 15, wherein the interaction corresponds to a failed authentication between the reader and the first mobile device.

21. The system of claim 15, wherein the first mobile device is associated with a first user and the second mobile device is associated with a second user different from the first user.

22. The system of claim 15, wherein obtaining, with the controller, the information related to the interaction comprises:
obtaining the information related to the interaction from at least one of the reader or the first mobile device.

23. The system of claim 15, wherein the information related to the interaction includes one or more of a data or time corresponding to access to the secure asset.

24. The system of claim 15, wherein the physical access point to the secure asset includes a lock associated with the physical access point.

25. A reader, comprising:
a processor; and
a storage medium storing instructions that, when executed, are configured to cause the processor to perform operations comprising:
receiving, at the reader from a first mobile device, credential information associated with the first mobile device;
conducting an interaction with the first mobile device based on the credential information, where the interaction is associated with a physical access point to a secure asset, the reader operatively coupled to the physical access point, the physical access point comprising a lock; and
communicating information related to the interaction to a server system via a mobile communications network, the information related to the interaction comprising one or more of a date or a time corresponding to access to the secure asset,
wherein the server system is configured to identify a second mobile device that is different from the first mobile device and enabled to receive interaction information relative to the reader, and route the information of the interaction to the second mobile device via the mobile communications network.

26. The reader of claim 25, wherein the information of the interaction includes location information describing a location of the interaction.

27. The reader of claim 25, wherein the first mobile device is associated with a first user and the second mobile device is associated with a second user different from the first user.

28. The reader of claim 25, wherein the server system is configured to obtain the information of the interaction from at least one of the reader or the first mobile device.

29. The reader of claim 25, wherein the information related to the interaction includes one or more of a data or time corresponding to access to the secure asset.

30. The reader of claim 25, wherein the physical access point to the secure asset includes a lock associated with the physical access point.

31. A system of operating a physical access control system associated with a physical access point to a secure asset, comprising:

a first mobile device storing credential information;
a second mobile device; and
a controller that is configured to perform operations comprising:
  receiving an indication that a reader operatively coupled to the physical access point has conducted an interaction with the first mobile device, the interaction comprising a transmission, by the first mobile device, of credential information to the reader, the physical access point comprising a lock;
  obtaining information related to the interaction, the information related to the interaction comprising one or more of a date or a time corresponding to access to the secure asset;
  identifying, the second mobile device as being enabled to receive interaction information relative to the reader; and
  routing the obtained information to the second mobile device via a mobile communications network.

* * * * *